United States Patent [19]
Thomas et al.

[11] Patent Number: 5,657,682
[45] Date of Patent: Aug. 19, 1997

[54] HOSE PISTON FOR TRANSPORTING EXTERNAL OBJECTS ALONG A FLEXIBLE HOSE

[75] Inventors: Paul Thomas, 1257 W. O'Farrell St., San Pedro, Calif. 90732; Semen Sorokotyazh, 1411 N. Poinsettia Pl., #308, Los Angeles, Calif. 90046; Arman Sassani, 18611 Santa Isadora St., Fountain Valley, Calif. 92708

[73] Assignees: Paul Thomas, San Pedro; Semen Sorokotyazh, Los Angeles; Arman Sassani, Fountain Valley, all of Calif.; part interest to each

[21] Appl. No.: 593,850

[22] Filed: Jan. 30, 1996

[51] Int. Cl.⁶ .................................................. F01B 19/04
[52] U.S. Cl. ........................ 92/84; 92/90; 92/92; 92/138
[58] Field of Search ................................. 92/51, 84, 88, 92/90, 92, 120, 138

[56] References Cited

U.S. PATENT DOCUMENTS

| | | |
|---|---|---|
| 2,473,430 | 6/1949 | Hoffar . |
| 2,483,088 | 9/1949 | Haven . |
| 2,695,694 | 11/1954 | Seinfeld . |
| 3,019,813 | 2/1962 | Dommann . |
| 3,045,611 | 7/1962 | Murray . |
| 3,421,718 | 1/1969 | Gehringer et al. . |
| 3,504,872 | 4/1970 | Russell-French . |
| 3,820,446 | 6/1974 | Granbom et al. . |
| 4,176,683 | 12/1979 | Leibinsohn . |
| 4,266,751 | 5/1981 | Akhavi . |
| 4,484,511 | 11/1984 | Dibrell .................................. 92/120 |
| 4,545,290 | 10/1985 | Lieberman ............................ 92/88 |
| 4,814,341 | 3/1989 | Vaughn ................................. 92/88 |
| 4,838,147 | 6/1989 | Grishchenko . |

FOREIGN PATENT DOCUMENTS 2816546  10/1979  Germany ............................... 92/90

*Primary Examiner*—F. Daniel Lopez
*Attorney, Agent, or Firm*—Thomas I Rozsa; Tony D. Chen

[57] ABSTRACT

A hose piston is disposed inside a flexible hose which is filled with fluid and movable in any direction upon hydraulic pressure. The rollers of an external device are engaged on the exterior surface of the flexible hose and are located adjacent to the midsection of the hose piston. The fluid pressure inside the flexible hose forces the hose piston to move along a given direction within the flexible hose, which in turn forces the rollers to travel in the same direction. This mechanism can transport the external device along the flexible hose.

30 Claims, 12 Drawing Sheets

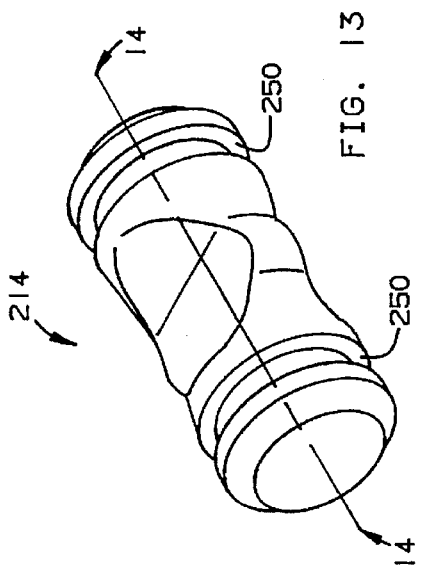
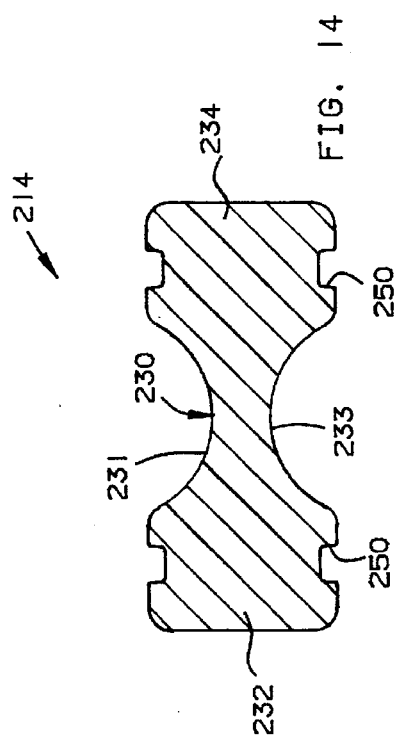
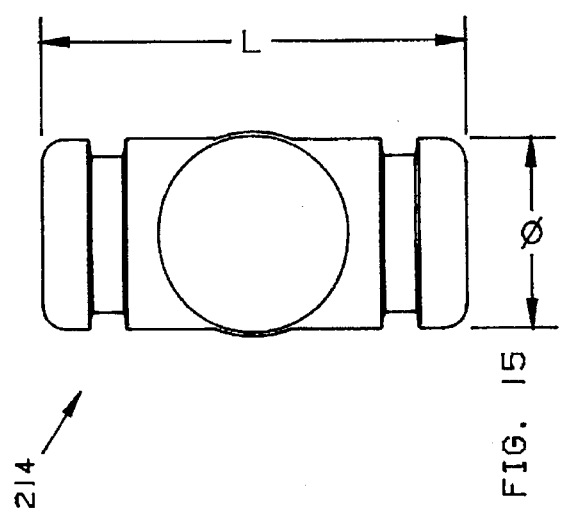
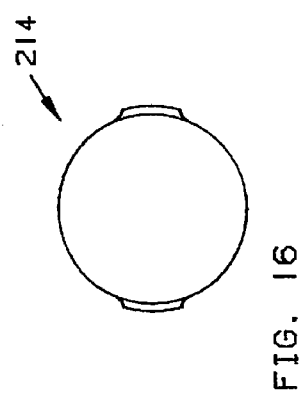

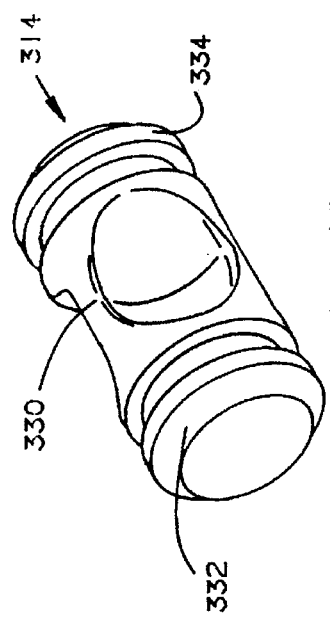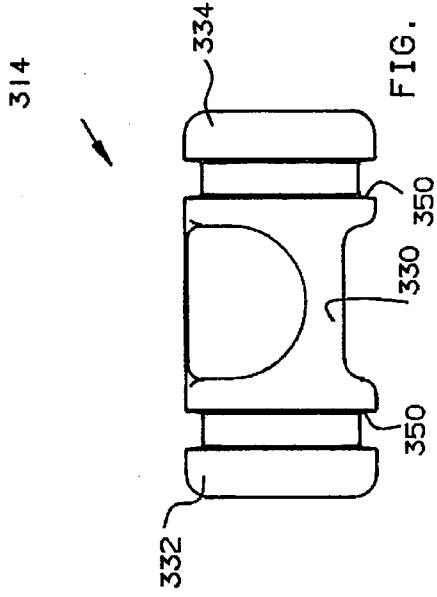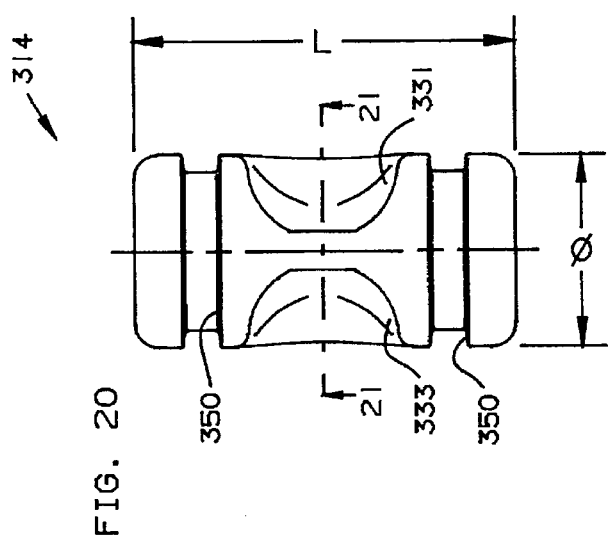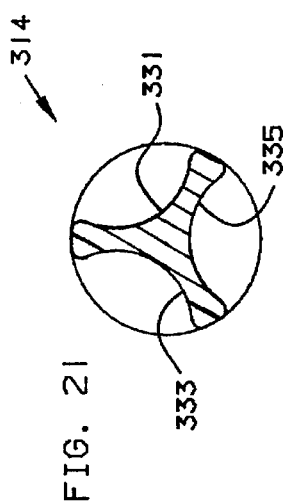

HOSE PISTON FOR TRANSPORTING EXTERNAL OBJECTS ALONG A FLEXIBLE HOSE

BACKGROUND OF THE INVENTION

1. Field of the Invention

The present invention generally relates to the field of actuators. More particularly, the present invention relates to a hose piston which is adapted to be moved inside a flexible hose under a pressure difference, which in turn causes an external device to travel along the flexible hose by the movement of the hose piston.

2. Description of the Prior Art

Generally, pistons which are adapted to move in a straight path within a cylinder by fluid pressure and which are further provided with a transmitting member which can be moved by the piston through movement of the piston have been known in the prior art for many years. One problem with these piston cylinders is how to effectively seal a cylinder slot through which the transmitting member passes. These prior art applications require a sealing member for sealing the slot as the transmitting member is passed through.

In such cases where relatively large forces are required to be overcome in propelling a member along a given path, such as in elevator or conveying systems, any leakage of the pressure fluid past the piston will operate to lessen the effectiveness of the propelling apparatus and in some instances may prevent the accomplishment of the desired results.

One of the disadvantages with prior art pistons is that they can only move in a straight path and are not adapted to move in a combination of straight and curved paths. Another disadvantage is that the piston is not flexible to maximize the efficiency of the piston inside the cylinder. Another disadvantage is that these prior art systems can only be utilized in a short range application.

The following eleven (11) prior art patents were uncovered in the pertinent field of the present invention:

1. U.S. Pat. No. 2,473,430 issued to Hoffar on Jun. 14, 1949 for "Piston Coupling Mechanism" (hereafter "the Hoffar Patent");
2. U.S. Pat. No. 2,483,088 issued to Haven on Sep. 27, 1949 for "Tensioning Device For Producing A Linear Pull" (hereafter "the Haven Patent");
3. U.S. Pat. No. 2,695,694 issued to Seinfeld on Nov. 30, 1954 for "Diaphragm Mechanism For Pump Clutches" (hereafter "the Seinfeld Patent");
4. U.S. Pat. No. 3,019,813 issued to Dommann on Feb. 6, 1962 for "Conduit Provided With Movable Fitting" (hereafter "the Dommann Patent");
5. U.S. Pat. No. 3,045,611 issued to Murray on Jul. 24, 1962 for "Fluid Pressure Devices" (hereafter "the Murray Patent");
6. U.S. Pat. No. 3,421,718 issued to Gehringer et al. on Jan. 14, 1969 for "Integral Seal For Aircraft Launching Cylinder" (hereafter "the Gehringer Patent");
7. U.S. Pat. No. 3,504,872 issued to Russell-French on Apr. 17, 1970 for "Sealing Apparatus For Aircraft Catapults" (hereafter "the Russell-French patent");
8. U.S. Pat. No. 3,820,446 issued to Granbom et al. on Jun. 28, 1974 for "Means At pressure Fluid Cylinders" (hereafter "the Granbom patent");
9. U.S. Pat. No. 4,176,683 issued to Leibinsohn on Dec. 4, 1979 for "Flow Regulator" (hereafter "the Leibinsohn patent");
10. U.S. Pat. No. 4,266,751 issued to Akhavi on May 12, 1981 for "Stripper Clamp" (hereafter "the Akhavi Patent"); and
11. U.S. Pat. No. 4,838,147 issued to Grishchenko on Jun. 13, 1989 for "Pressure Fluid Actuator"(hereafter "the Grishchenko Patent").

The Hoffar patent discloses a piston coupling mechanism. It comprises a cylinder which has a slot through its wall in the lengthwise direction. A feed piston is received within the cylinder and coupled to a drill motor by a connecting plate which is secured to or integral with the piston. The connecting plate projects outwardly from the piston through the slot extending lengthwise of the cylinder and extends over substantially its entire length. The outer end is received between projections formed on the body of the drill motor. If the pressure of the fluid in opposite ends of the cylinder is unequal, the piston will be driven away from the high pressure end and toward the low pressure end, sliding along a sealing strip.

The Dommann Patent discloses a conduit provided with a movable "T" fitting. A slit extends longitudinally along the conduit and radially through the conduit wall. The wall portions of the conduit wall which defines the slit are provided with a tongue and groove joint. A C-shaped fastener clamps the wall portions together. The fitting-conduit combination is moved along the conduit as desired while at all times maintaining the fluid connection between the conduit and a connecting line which is connected to the fitting. The "T" stem discharges into the extensions to which connections or other supply means can be made. The conduit-fitting combination can be employed to supply air to move equipment, such as a long face mining planer.

The Murray Patent discloses fluid pressure devices. It comprises a collapsible resilient hose which is positioned between the walls and lies on the bottom of a track. The collapsible hose expands to an expanded condition when internally subjected to fluid pressure. A carriage is provided for cooperation with the hose and track. The carriage comprises a propelling roller placed between the walls of the track. A shaft extends through the roll on the shaft and bearing which is provided as a journaling roll on shaft. Pendants are fixed to the outer extremities of the shaft and they carry counter rolls at their lower ends in an aligned relationship. The object to be propelled is attached to the carriage. When pressure fluid is introduced to the interior of the hose on either side of the carriage, an unbalanced moment is set up about the axis of the rolls causing the pendants to tilt in the direction of the propelling force. The hose is adapted to be supplied with fluid under pressure to each of its ends. The ends of the hose are provided with fluid pressure-tight fittings to which supply lines are connected. The lines are in turn connected to a valve housing within which a reciprocable spool valve is mounted. A supply line admits fluid under pressure to the valve housing and the supply line comprises a branch that leads to a pressure reducing valve. The branch lines lead to the housing at opposite ends so that constant pressure acts at all times on both ends of the spool when the valves are closed.

The Granbom Patent discloses a pressure fluid cylinder. It comprises a cylinder and piston adapted to be moved by pressure fluid. In the cylinder wall, there is a longitudinal slot where a transmitting member is projected. The transmitting member is secured on the piston by a mounting plate. A sealing member has the form of a thin tape-shaped strip and is attached by magnets to close the slot. The sealing member is moved below on the transmitting member so as to permit the mounting plate to project through the slot.

The Leibinsohn Patent discloses a flow regulator. It comprises a core, an outer flexible sleeve, and a split ring presettable along the outer surface of the flexible sleeve for presetting the rate of flow of the fluid through the device. The fluid flowing through space is thus forced, where the sleeve is pressed against the core, to flow through the helical recess to pass from one side to the opposite side of the ring. The cross-section of this passageway depends on the location of the split-ring, and therefore the ring is preset to any selected position to fix the desired rate of flow.

The Grishchenko Patent discloses a pressure fluid actuator. It comprises a force transfer bracket and a flexible hose disposed within the interior of the actuator chamber and adapted for reciprocal movement. In the wall of the actuator chamber structure there is an elongated slot through which the transfer bracket projects upward and outward. It comprises rollers which are secured on the shaft for engaging with the flexible hose. As fluid pressure is introduced into the pressure compartment of the hose member on either side of the actuator through the end fitting, the hose member begins to inflate, thereby creating a displacement effect for the rollers of the transfer bracket and causing the bracket to move in a direction opposite to the fluid pressure introduction side. The movement of the transfer bracket is guided along the actuator chamber structure with guide plates and bearing rods.

The Haven Patent discloses a tensioning device for producing a linear pull. It comprises an outer tube of strands woven on the diagonal to form a plurality of helices, an inner tube, and two plugs. The inner tube is confined within the outer tube and ends of the outer tube are sealed by the two plugs. The fluid pressure to be applied within the inner tube is an ignitible gas-evolving pressure-producing material.

The Seinfeld Patent discloses a diaphragm mechanism for pump clutches. It comprises two stationary casing members with conduits for the fluid to be conveyed. The device is used as a seal transmission device.

The Russell-French Patent discloses a sealing apparatus for closing a slot in a track cover in which the shuttle of aircraft steam launching engines operate. Sealing means are disposed along the under margins of the slot. The sealing means are divided into opposite groups affixed to opposite sides of the slot, each group comprising a multiplicity of pliant finger members overlapping the finger members of the opposite group to provide an effective sealing means to prevent the escape of low pressure steam to the deck above.

The Gehringer Patent discloses an integral seal for an aircraft launching cylinder. It comprises a tow cart which pulls a cable connected to an aircraft that is to be launched.

The Akhavi Patent discloses a stripper clamp. It comprises an exposed roller for manually rolling along a flexible tube to express the tube's contents.

None of these prior art patents have disclosed a hose piston disposed inside a continuous flexible hose, thereby creating a fluid mechanism wherein the fluid pressure difference inside the flexible hose will force the hose piston to move along a given direction within the flexible hose, which in turn causes rollers of an external device to travel in a direction along the same line as the direction of movement of the hose piston. It is highly desirable to have a very efficient and also very effective design and construction of an apparatus for transporting objects along various lengths of movement.

SUMMARY OF THE INVENTION

The present invention is an apparatus for transporting external objects along a flexible hose. The apparatus comprises a hose piston that actuates a device which is externally attached to a flexible hose member. The hose piston is disposed inside the continuous flexible hose member which is filled with fluid and the hose piston can be moved in any direction by hydraulic pressure or any suitable pressure, e.g., oil or air pressure. Two or more rollers are engaged on an exterior surface of the flexible hose member and are located adjacent to a midsection of the hose piston. Two or more rollers may be attached to the external device which is externally attached to the flexible hose member. When the fluid is under pressure, it pushes the hose piston inside the flexible hose member, which in turn causes the rollers to move along on the flexible hose member, which in turn moves the external device.

The fluid pressure inside the flexible hose member will force the hose piston to move along a given direction within the flexible hose member. The hose piston itself will then force the rollers to travel in the same direction as the movement of the hose piston, thereby creating a fluid mechanism wherein the fluid pressure difference inside the flexible hose member will force the hose piston to move inside the flexible hose member, which in turn causes the rollers of the external device to move in a direction along the same line as the direction of movement of the hose piston. The present invention can be used for various lengths of movement. It has been discovered, according to the present invention, that by providing an apparatus which comprises a hose piston disposed inside a flexible hose member, then the hose piston can be propelled by fluid pressure inside the flexible hose member created by a force such as hydraulic pressure, which in turn causes an external device which is externally attached to the flexible hose member to move in any direction.

It has also been discovered, according to the present invention, that by providing an apparatus which comprises a hose piston disposed inside a flexible hose member, then if an external device has two or more rollers engage on an exterior surface of the flexible hose member, and when fluid inside the hose is under pressure, it pushes the hose piston inside the flexible hose member, which in turn causes the two or more rollers to roll along the exterior surface of the flexible hose member, which in turn moves the external device.

It has additionally been discovered, according to the present invention, that by providing an apparatus which comprises a hose piston disposed inside a flexible hose member which is filled with fluid, then the fluid pressure difference inside the flexible hose member will force the hose piston to move along a given direction within the flexible hose member, where the hose piston itself will then force the two or more rollers attached along the exterior surface of the hose to travel in the same direction as the movement of the hose piston.

It has further been discovered, according to the present invention, that by providing an apparatus which comprises a hose piston formed by a multiplicity of pieces which are interconnected to each other in series, then the hose piston will provide an efficient means to seal itself within the flexible hose member because of its flexibility to adjust inside the flexible hose member.

It has additionally been discovered, according to the present invention, that by providing an apparatus which comprises a hose piston disposed inside a flexible hose member, where the hose piston has a midsection with a multiplicity of arc surfaces, then a multiplicity of rollers of an external device can engage and compress the flexible hose member against the multiplicity of arc surfaces of the hose piston, thereby accommodating the multiplicity of rollers so that when the hose piston moves inside the flexible hose member, the multiplicity of rollers will also move in the direction of the movement of the hose piston.

It has still further been discovered, according to the present invention, that by providing an apparatus which comprises a hose piston disposed inside a flexible hose member, then the hose piston will seal itself within the flexible hose member in a sealed fashion without any assistance from other devices.

It is therefore an object of the present invention to provide an apparatus which comprises a hose piston disposed inside a flexible hose member so that the hose piston can be propelled by fluid pressure inside the flexible hose member created by a force such as hydraulic pressure, which in turn causes an external device which is externally attached to the flexible hose member to move in any direction.

It is also an object of the present invention to provide an apparatus which comprises a hose piston disposed inside a flexible hose member so that when two or more rollers of an external device engage on the flexible hose member, and when fluid inside the hose is under pressure, it pushes the hose piston inside the flexible hose member, which in turn causes the two or more rollers to roll along on the flexible hose member, which in turn moves the external device.

It is an additional object of the present invention to provide an apparatus which comprises a hose piston disposed inside a flexible hose member which is filled with fluid, so that the fluid pressure difference inside the flexible hose member will force the hose piston to move along a given direction within the flexible hose member, where the hose piston itself will then force the two or more rollers attached along the external surface of the hose to travel in the same direction as the hose piston movement.

It is a further object of the present invention to provide an apparatus which comprises a hose piston formed by a multiplicity of pieces interconnected to each other in series, so that the hose piston will provide an efficient means to seal itself within the flexible hose member because of its flexibility to adjust inside the flexible hose member.

It is an additional object of the present invention provide an apparatus which comprises a hose piston disposed inside a flexible hose member, where a midsection of the hose piston comprises a multiplicity of arc surfaces so that two or more rollers of an external device can engage and compress the flexible hose member against the multiplicity of arc surfaces of the hose piston so that the hose piston will move the two or more rollers which in turn causes the external device to move in the direction of the hose piston movement.

It is still a further object of the present invention to provide an apparatus which comprises a hose piston disposed inside a flexible hose member, so that the hose piston seals itself within the flexible hose member in a sealed fashion without any assistance from other devices.

It is also an object of the present invention to provide an apparatus which comprises a hose piston disposed inside a flexible hose member, where the hose piston can be actuated by fluid pressure to move within the flexible hose member and the hose piston is capable of propelling an external device along a straight path, a curved path, or any combination of straight and curved paths on the flexible hose member, either reciprocally or continuously in one direction.

It is a further object of the present invention to provide a hose piston which has a symmetrical body so that it will be more efficient than an asymmetrical body.

It is another object of the present invention to provide an apparatus which comprises a hose piston disposed inside a flexible hose member, where the hose piston can be actuated by a magnetic field or electromagnetic field to move within the flexible hose member and the hose piston is capable of propelling an external device along a straight path, a curved path, or any combination of straight and curved paths on the flexible hose member, either reciprocally or continuously in one direction.

In the preferred embodiment, the present invention hose piston comprises a symmetrical five piece configuration interconnected to each other in series and disposed in an elongated continuous flexible hose member, where a midsection of the hose piston may have two or more arc surfaces for accommodating two or more rollers of an external device so that the rollers engage and compress the flexible hose member against the midsection of the hose piston.

In a second embodiment of the present invention, the hose piston is a symmetrical unitary piece which utilizes no O-rings and a midsection with two opposite arc surfaces.

In a third embodiment of the present invention, the hose piston is a symmetrical unitary piece which utilizes O-rings and a midsection with two opposite arc surfaces.

In a fourth embodiment of the present invention, the hose piston comprises a midsection with three arc surfaces.

In a fifth alternative embodiment of the present invention, the hose piston comprises a midsection with no arc surfaces.

Further novel features and other objects of the present invention will become apparent from the following detailed description, discussion and the appended claims, taken in conjunction with the drawings.

BRIEF DESCRIPTION OF THE DRAWINGS

Referring particularly to the drawings for the purpose of illustration only and not limitation, there is illustrated:

FIG. 13 is a perspective view of a third embodiment of the present invention hose piston, showing a unitary configuration utilizing O-rings;

FIG. 14 is a cross-sectional view taken along line 14—14 of FIG. 13;

FIG. 15 is a top plan view of the hose piston shown in FIG. 13, the bottom plan view being identical;

FIG. 16 is an end elevational view of the hose piston shown in FIG. 13, the other end being identical;

FIG. 18 is a perspective view of a fourth embodiment of the present invention hose piston, showing a unitary configuration with a midsection having three arc surfaces;

FIG. 19 is a side elevational view of the hose piston shown in FIG. 18;

FIG. 20 is a top plan view of the hose piston shown in FIG. 18;

FIG. 21 is a cross-sectional view taken along line 21—21 of FIG. 20;

DESCRIPTION OF THE PREFERRED EMBODIMENT

Although specific embodiments of the present invention will now be described with reference to the drawings, it should be understood that such embodiments are by way of example only and merely illustrative of but a small number of the many possible specific embodiments which can represent applications of the principles of the present invention. Various changes and modifications obvious to one skilled in the art to which the present invention pertains are deemed to be within the spirit, scope and contemplation of the present invention as further defined in the appended claims.

Figure 1:
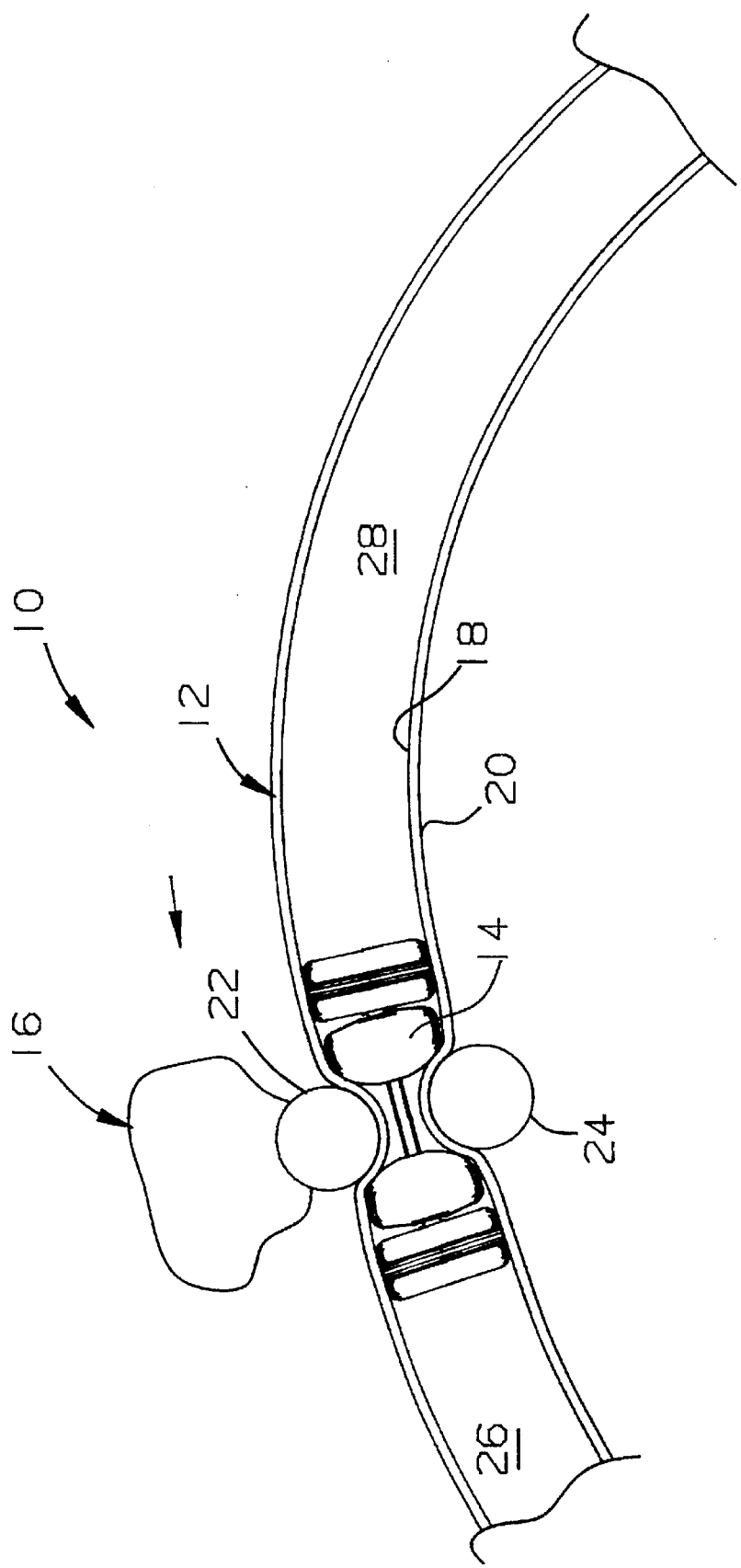
FIG. 1 is a side elevational view of the preferred embodiment of the present invention hose piston which is disposed inside a non-straight flexible hose member.
Figure 2:
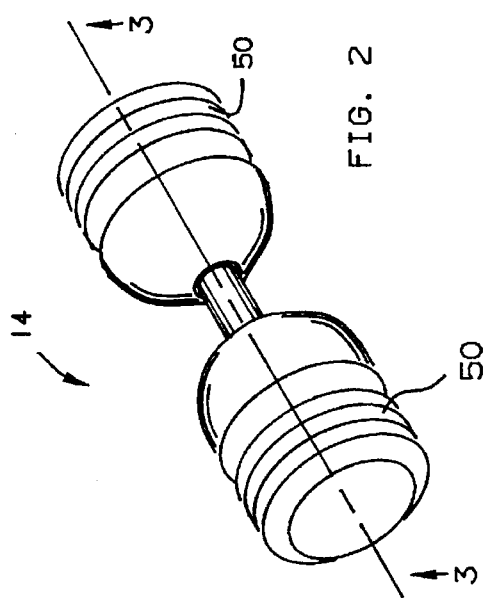
FIG. 2 is a perspective view of the hose piston shown in FIG. 1, showing a five piece configuration.

Referring to FIG. 1, there is shown at 10 the present invention apparatus which comprises a flexible hose member 12, a hose piston member 14 and an external coupling device 16.

The apparatus 10 can be used, for example, in a marine application, a robot application, low gravity application or other applications for transporting objects along the flexible hose member 12. The apparatus 10 has the capability for long range application as well as for short range application, e.g., in a short movement application to raise or lower a table.

The flexible hose member 12 is generally an elongated hollow continuous cylindrical shaped hose. The hose member 12 can be either straight, curved or a combination of both. The hose member 12 comprises an interior surface 18 and an exterior surface 20. The present invention discloses a reciprocating actuator apparatus such that the hose member 12 is adapted to be supplied with fluid under pressure at each of its ends by air pressure, oil or other suitable means. The hose member 12 is further provided with means (not shown) for operating the apparatus 10, such as pressure-tight fittings (not shown) and connecting fittings for the pressure fluid circulation for supplying drive fluid to the interior of the flexible hose member 12. Each end of the flexible hose member 12 may have a pump for pumping fluid into the flexible hose member, a reservoir tank for containing the fluid, and a check valve, which are all conventional in the art.

Figure 6:
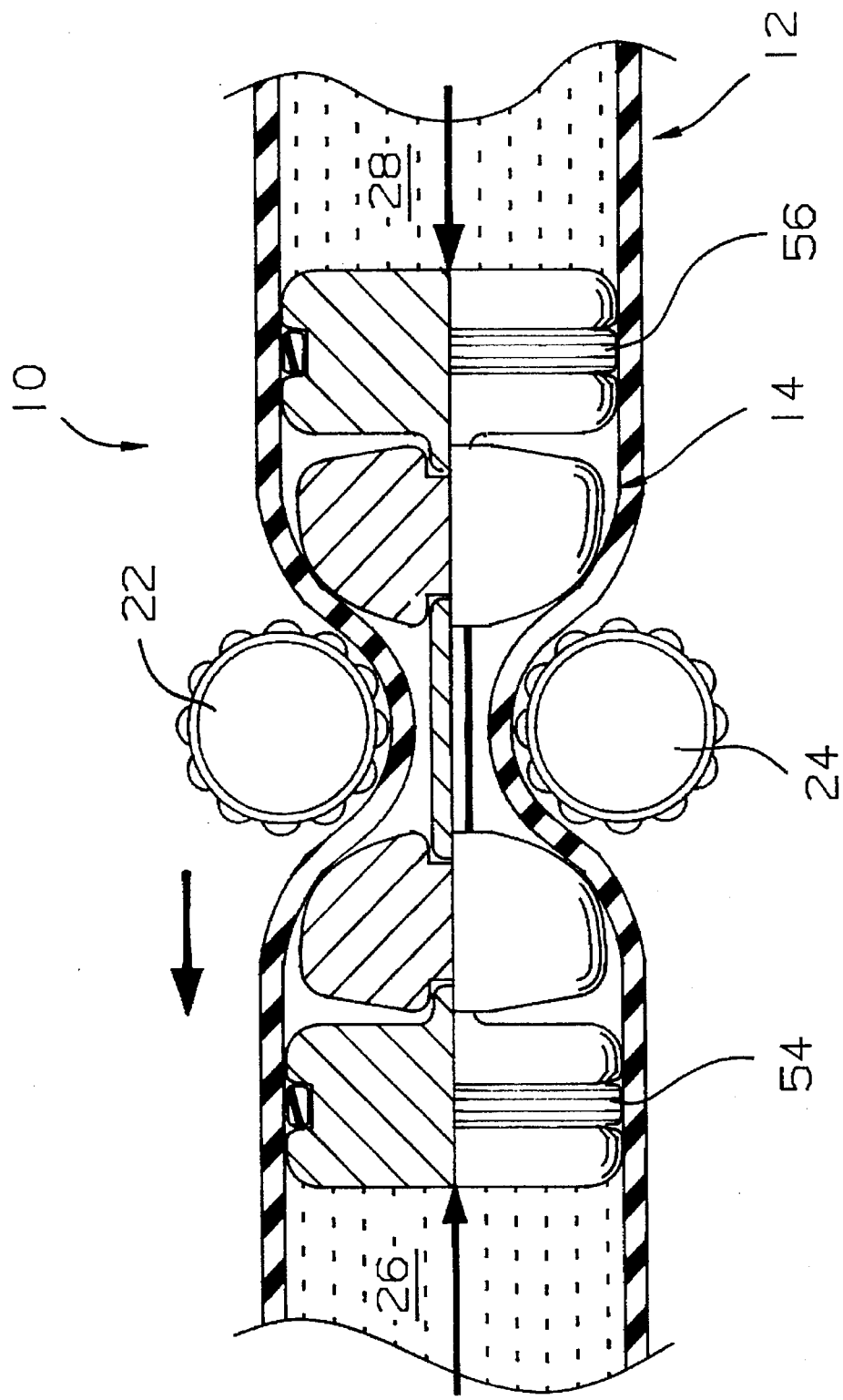
FIG. 6 is an enlarged partial cross-sectional view of the hose piston shown in FIG. 2, where the hose piston is disposed inside the flexible hose member with roller means engaged on the flexible hose member.

Referring to FIGS. 1 and 6, there is shown the external coupling device 16 which comprises two or more rollers 22 and 24. The rollers 22 and 24 are placed in contact with the exterior surface 20 of the flexible hose member 12, such that the rollers 22 and 24 engage and compress the flexible hose member 12 against a midsection of the hose piston member 14, where the rollers 22 and 24 can roll along on the flexible hose member 12. The two or more rollers 22 and 24 and their interconnecting links together form a support structure to be engaged by, and move along the flexible hose member 12 as it is propelled by the hose piston member 14.

Referring to FIG. 6, the hose piston member 14 is disposed inside the flexible hose member 12 and tightly engaged with the interior surface 18 of the hose member 12 in a sealed fashion. The internal diameter of the hose member 12 is slightly less than the diameter of the hose piston member 14 so that the hose member 12 is sealed by the piston member 14. The hose member 12 is filled with fluid, where the fluid pressure difference inside the hose member 12 will force the hose piston member 14 to move along a given direction within the hose member 12, which in turn causes the rollers 22 and 24 of the coupling device 16 to travel along on the hose member 12. A fluid mechanism is created inside the hose member 12 wherein the fluid force 26 inside the hose member 12 and fluid force 28 against the hose piston member 14 can cause the rollers 22 and 24 of the external device 16 to move in a direction along the same line as the direction of movement of the hose piston member 14. The propelling of the external coupling device 16 is caused by different pressures within the flexible hose member 12.

Figure 3:
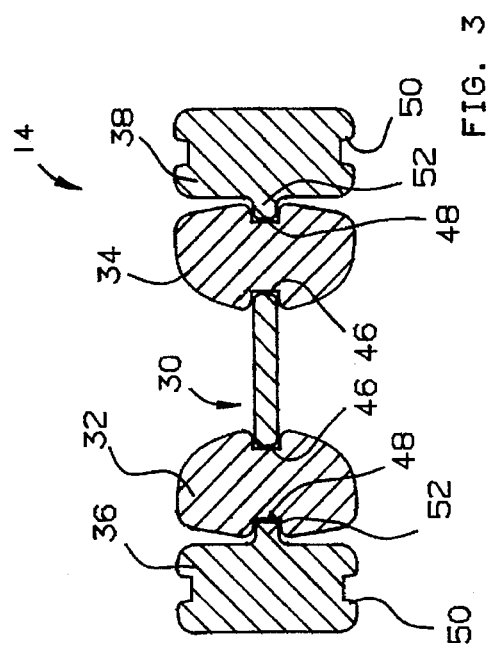
FIG. 3 is a cross-sectional view taken along line 3—3 of FIG. 2.
Figure 4:
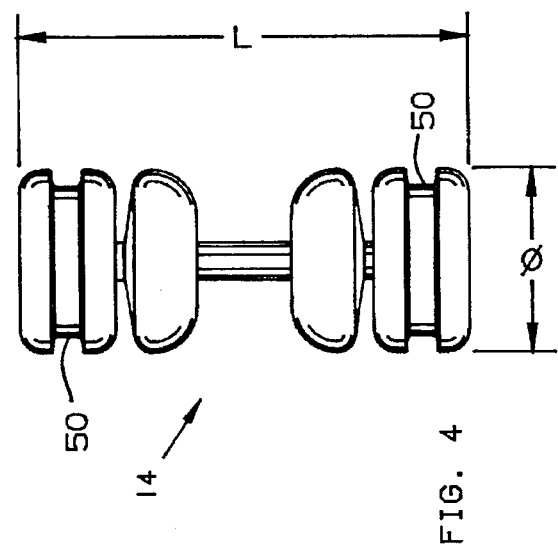
FIG. 4 is a top plan view of the hose piston shown in FIG. 2, the bottom plan view being identical.
Figure 5:
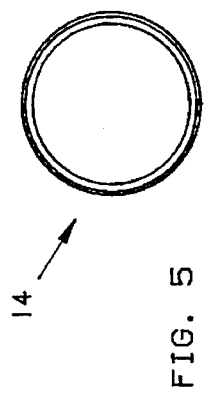
FIG. 5 is an end elevational view of the hose piston shown in FIG. 2, the other end being identical.

Referring to FIGS. 2, 3, 4 and 5, there is shown the preferred embodiment of the hose piston member 14 which comprises a multiplicity of individual pieces loosely interlocked to each other in series, and thereby forming a generally longitudinal cylindrical symmetrical body. The length "L" of the hose piston member 14 may be three times longer than the diameter "φ" of the hose piston member 14. In the preferred embodiment, the cylindrical symmetrical hose piston member 14 is a five piece configuration as shown in FIG. 3.

Referring to FIG. 3, there is shown at 14 a cross sectional view of the hose piston member which comprises a midsection 30, two opposite proximal portions 32 and 34 attached to the midsection 30, and two opposite distal portions 36 and 38 respectively attached to the two opposite proximal portions 32 and 34. The midsection 30 is generally a cylindrical shaped rod or shaft. It will be appreciated that the midsection 30 is not limited to the cylindrical shaped rod as shown. It is also within the spirit and scope of the present invention to have a rectangular shaped shaft or any suitable means which can loosely be connected to the proximal portions 32 and 34 of the hose piston member 14.

Each of the proximal portions 32 and 34 of the hose piston member 14 are substantially identical, and to the extent they are, only one will be described in detail. The proximal portion 32 has two notch apertures 46 and 48 at opposite ends.

Each of the distal portions 36 and 38 of the hose piston member 14 are substantially identical, and to the extent they are, only one will be described in detail. The distal portion 36 has a protruding boss 52 at one end and a transverse annular groove 50 surrounding the middle of the distal portion 36.

The multiplicity of individual pieces of the hose piston member 14 are interconnected together in series by respectively interlocking each protruding boss 52 of the two distal portions 36 and 38 into a respective one of the notch apertures 48 of the two proximal portions 32 and 34. The ends of the midsection 30 are inserted and interlocked into a respective one of the notch apertures 46 of the proximal portions 32 and 34.

It will be appreciated that the hose piston member 14 is not limited to the above description. It is emphasized that while the five-piece configuration is the preferred embodiment, it is also within the spirit and scope of the present invention to have a unitary configuration.

It will be appreciated that the hose piston member 14 is not limited to a symmetrical shaped body as shown. It is also within the spirit and scope of the present invention to construct an asymmetrical shaped body of the hose piston member 14.

Figure to FIG. 6, there is shown two O-ring seals 54 and 56 which are provided with the hose piston member 14. The two O-ring seals 54 and 56 are respectively disposed within the annular grooves 50 of the two opposite distal portions 36 and 38 for assisting in sealing the hose piston member 14 within the flexible hose member 12.

The hose piston member 14 and the flexible hose member 12 can be made from several materials. By way of example, the hose piston member 14 can be made of aluminum material or any other suitable material. By way of example, the flexible hose member 12 can be made of polyethylene material or any other suitable material.

Figure 7:
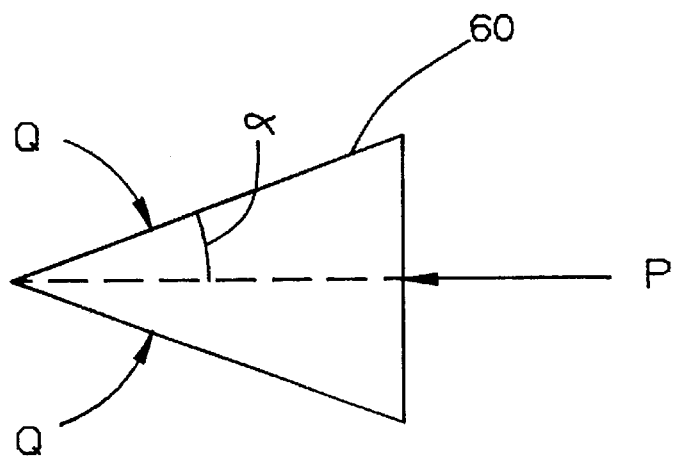
FIG. 7 is a diagram of a force system on a wedge.

Referring to FIG. 7, there is shown a diagram of a force system on a wedge 60. The equation can be defined as:

$$P = 2Q(\mu \cos \alpha + \sin \alpha) \quad [1]$$

where:

P is the force applied to the wedge;
Q is the resistance force against the upper and lower surfaces of the wedge;
$\mu$ is the coefficient of friction; and
$\alpha$ is half the angle of the wedge.

Figure 8:
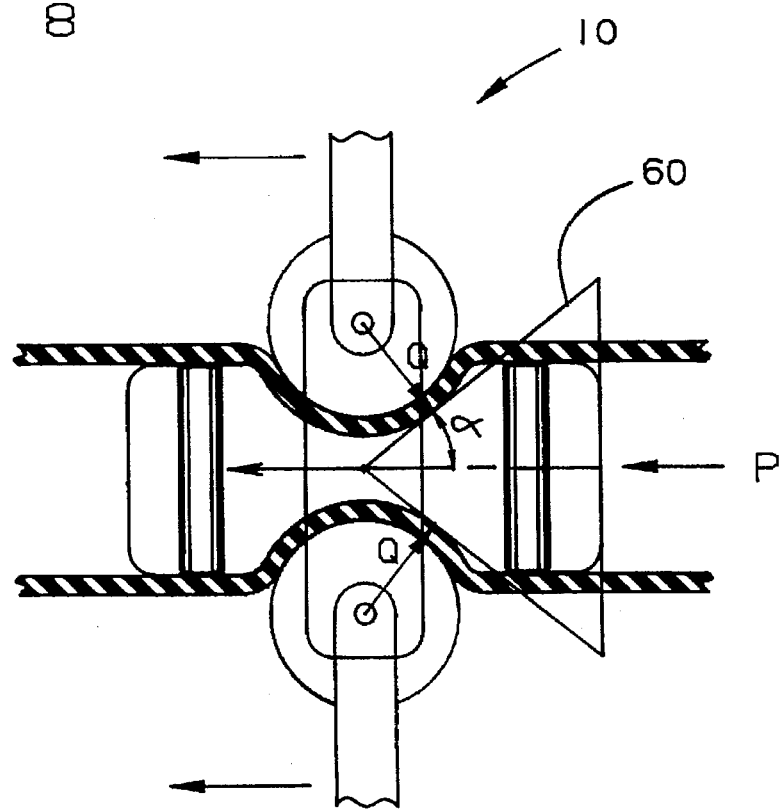
FIG. 8 is a diagram of the present invention system, showing how the net force $F_1/2$ can be calculated.

Referring to FIG. 8, there is shown a diagram of the apparatus used in combination with the external device movably attached externally to move the external device along on the flexible hose member. If the pressure in the flexible hose member is $P_a$, then the resultant force "F" is:

$$F = \frac{\pi D^2}{4} P_a \quad [2]$$

with two surfaces of friction:

$$Q = \frac{F}{2[(\mu_1 + \mu_2)\cos\alpha + \sin\alpha]} \quad [3]$$

assume $\mu_1 \approx \mu_2 \approx \mu$: where $\mu_1$, is the coefficient for the surface of the piston member, and $\mu_2$ is the coefficient for the interior surface of the hose member.

$$Q = \frac{F}{2(2\mu \cos\alpha + \sin\alpha)} \quad [4]$$

The force system of the external device is:

$$F_1 = 2Q \sin\alpha \quad [5]$$

where $F_1$ is the force exerted on the external device along the direction of the piston member movement. From equations [4] and [5]:

$$F_1 = \frac{2F \sin\alpha}{2(2\mu \cos\alpha + \sin\alpha)} = \frac{F}{2\mu \cot\alpha + 1} \quad [6]$$

$$F_1 = \frac{\pi D^2}{4(2\mu \cot\alpha + 1)} P_a \quad [7]$$

If $\alpha = 60°$, $\cot \alpha = 0.58$, and $\mu = 0.1$, then from equation [6]:

$$F_1 = \frac{F}{2 \times 0.1 \times 0.58 + 1} = \frac{F}{1.116} = 0.9F$$

with $\mu = 0.05$, $$F_1 = \frac{F}{2 \times 0.05 \times 0.58 + 1} = \frac{F}{1.058} = 0.95F$$

with 0.9 efficiency of the apparatus the total efficiency is $\approx 0.8$, i.e.:

$$F_1 \approx 0.8F$$

If $P_a = 100$ psi (lb/in.$^2$), D=2 inches, then from equations [7] and [8]:

$$F_1 \approx 0.8 \frac{\pi D^2}{4} P_a = 0.8 \frac{3.14 \times 2^2}{4} 100$$

i.e.:=251 lbs. This means that a force of 251 lbs is exerted on the external object along the direction of the movement of the piston member.

Figure 9:
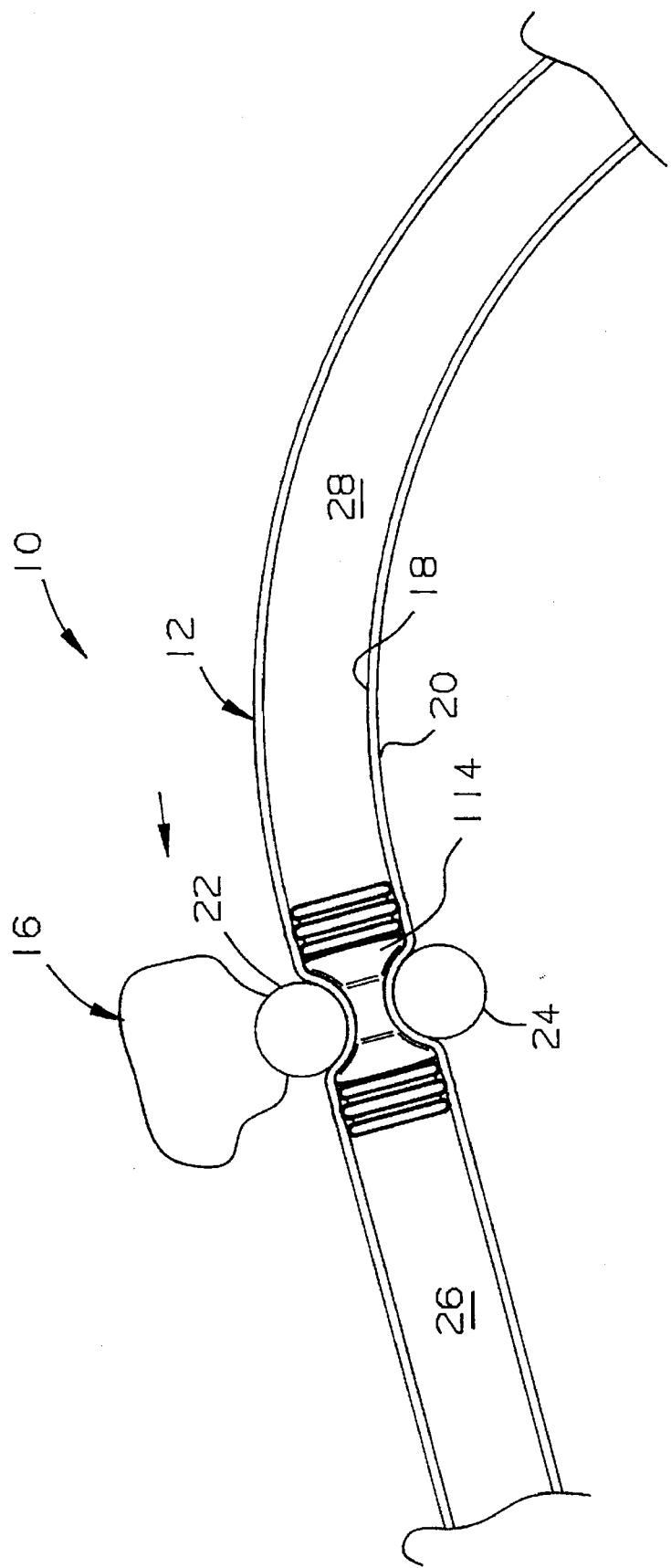
FIG. 9 is a side elevational view of a second embodiment of the present invention hose piston which is disposed inside a non-straight flexible hose member.

Referring to FIG. 9, there is shown at 10 the present invention apparatus which comprises a flexible hose member 12, an external coupling device 16 and a second embodiment of a hose piston member 114. The flexible hose member 12 and the external coupling device 16 are identical to the ones discussed above, and the description thereof will not be repeated. The only difference between this embodiment and the preferred embodiment is the nature and configuration of the hose piston member 114. All of the parts of this embodiment of the hose piston member 114 are numbered correspondingly with 100 added to each number.

Figure 10:
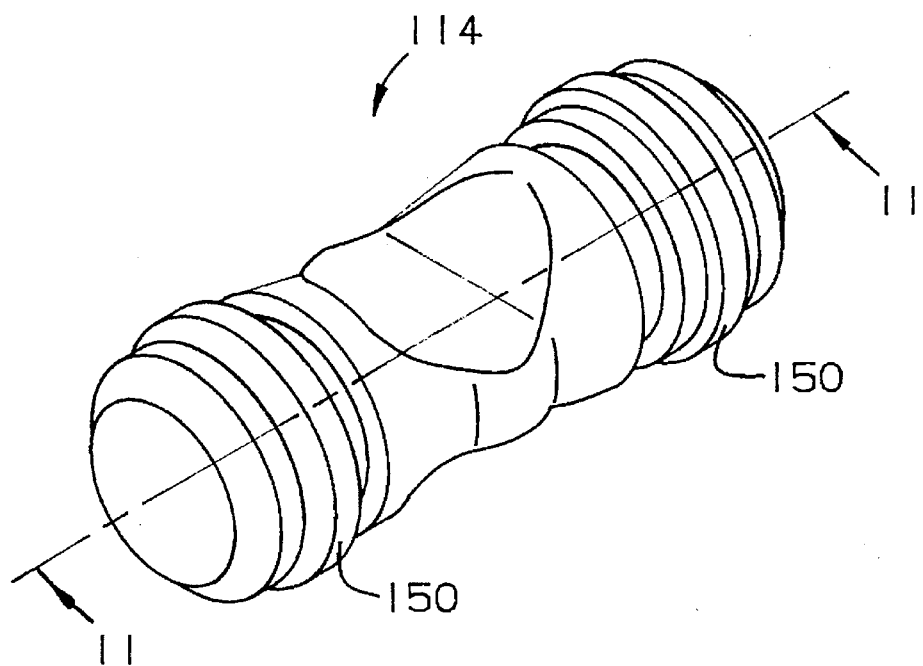
FIG. 10 is a perspective view of the hose piston shown in FIG. 9, showing a unitary configuration utilizing no O-rings.
Figure 11:
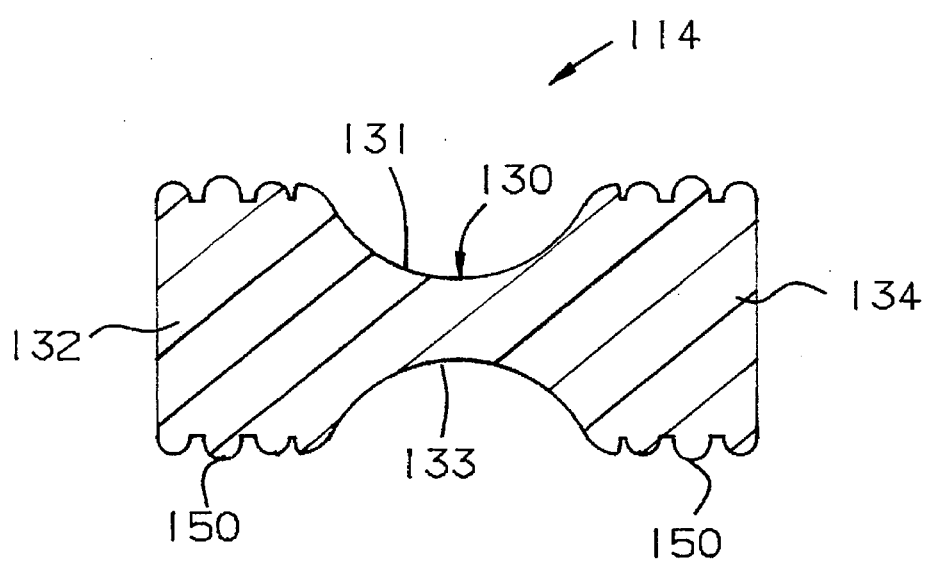
FIG. 11 is a cross-sectional view taken along line 11—11 of FIG. 10.
Figure 12:
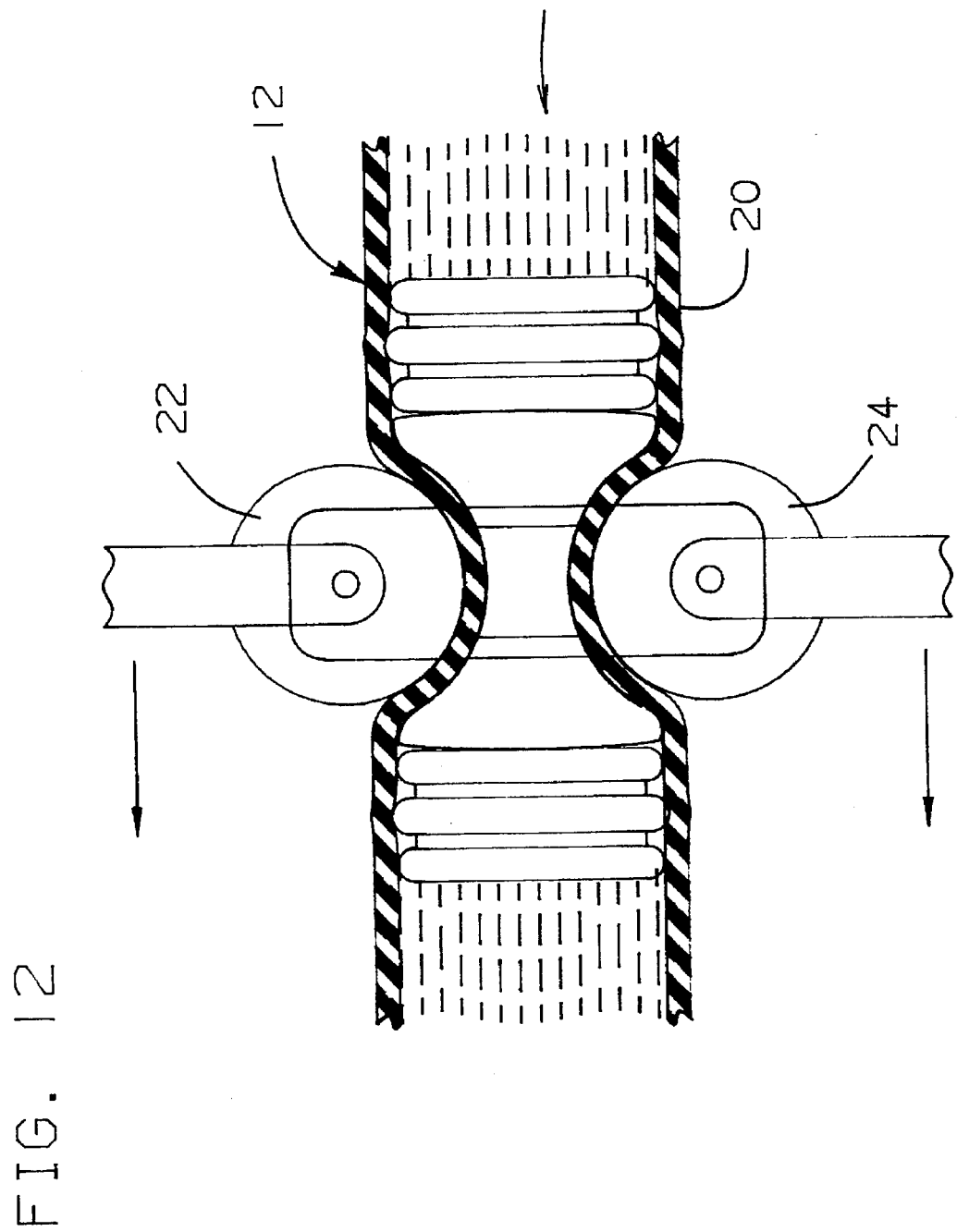
FIG. 12 is a partial cross-sectional view of the hose piston shown in FIG. 10, where the hose piston is disposed inside the flexible hose member with roller means engaged on the flexible hose member.

Referring to FIGS. 10 and 11, there is shown the second embodiment of the hose piston member 114 which is generally a longitudinal cylindrical symmetrical unitary configuration. In this embodiment, the hose piston member 114 does not require O-ring seals. The hose piston member 114 comprises a midsection 130, and two opposite proximal portions 132 and 134. The midsection 130 has two arc surfaces 131 and 133, where two or more rollers 22 and 24 of the external device 16 engage and compress the flexible hose member 12 against the midsection 130 of the hose piston member 114 (see FIG. 9). Each of the proximal portions 132 and 134 has a transverse annular raised ridge 150, where the raised ridge assists in sealing the hose piston member 114 inside the hose member 12.

Referring to FIG. 13, there is shown a perspective view of the third embodiment of the present invention hose piston member 214 which is very similar to the preferred embodiment and the only difference is the nature and configuration of the hose piston member. All of the parts of this embodiment of the hose piston member 214 are numbered correspondingly with 200 added to each number. In this embodiment, the hose piston member 214 is made from a unitary piece which forms a generally longitudinal cylindrical symmetrical body.

Figure 17:
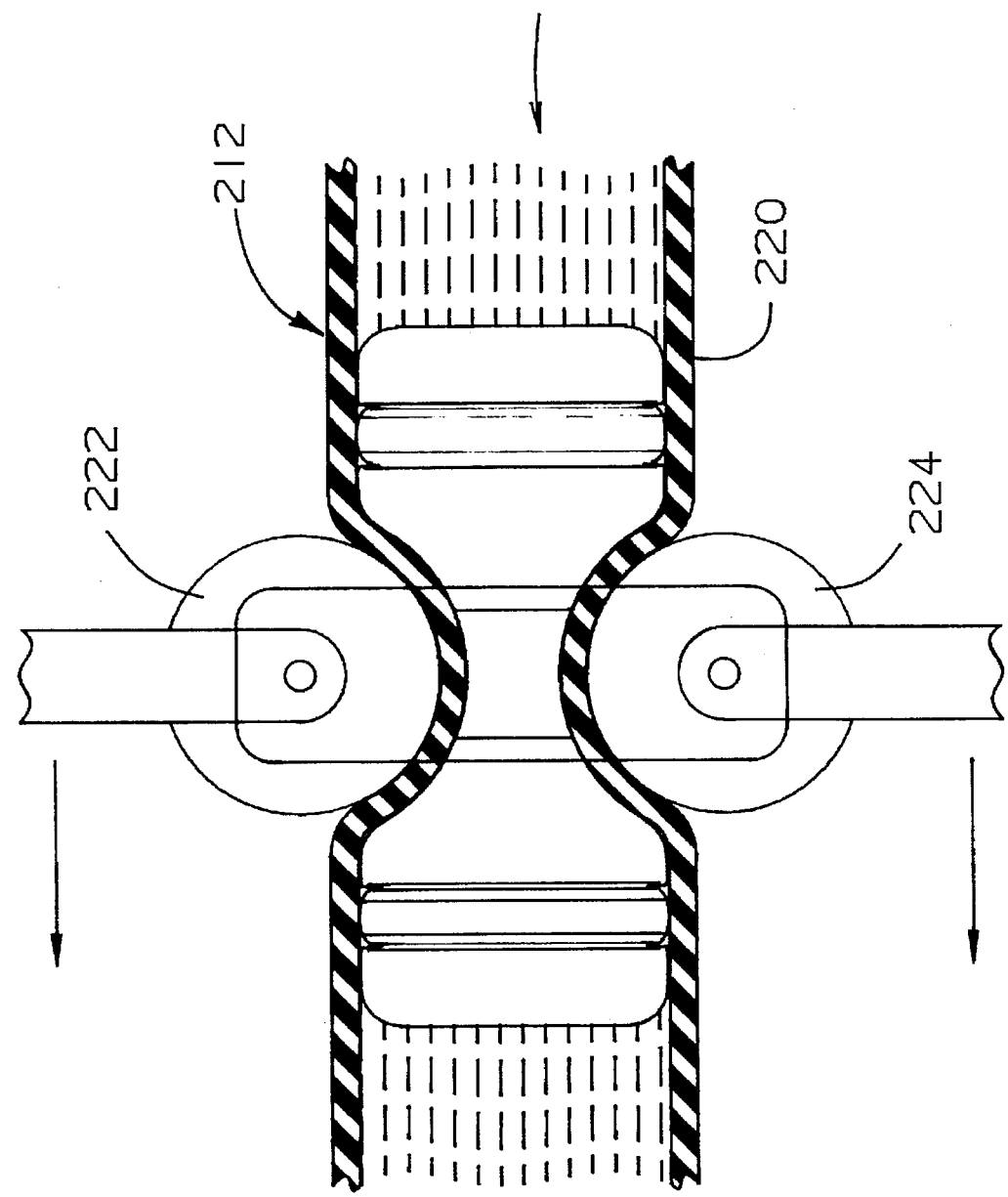
FIG. 17 is a partial cross-sectional view of the hose piston shown in FIG. 13, where the hose piston is disposed inside a flexible hose member with roller means engaged on the flexible hose member.

Referring to FIGS. 14, 15 and 16, there is shown the hose piston member 214 which comprises a midsection 230 and two opposite proximal portions 232 and 234. The midsection 230 has a top concave surface 231 and a bottom convex surface 233, where two rollers 222 and 224 of an external device engage and compress a flexible hose member 212 (see FIG. 17) against the midsection 230 of the hose piston member 214. The proximal portions 232 and 234 of the hose piston member 214 each have a transverse annular groove 250 surrounding the middles of the proximal portions 232 and 234 for accommodating O-ring seals (see FIG. 17) to seal the hose piston member 214 inside the flexible hose member 212. The length "L" of the hose piston member 214 may be three times longer than the diameter "φ" of the hose piston member 214 as shown in FIG. 15.

Referring to FIG. 18, there is shown a perspective view of the fourth embodiment of the present invention hose piston member 314 which is very similar to the preferred embodiment and the only difference is the nature and configuration of the hose piston member. All of the parts of this embodiment of the hose piston member 314 are numbered correspondingly with 300 added to each number. The hose piston member 314 is made from a unitary piece which forms a generally longitudinal cylindrical symmetrical body.

Referring to FIGS. 19, 20 and 21, there is shown the hose piston member 314 which comprises a midsection 330 and two opposite proximal portions 332 and 334. The midsection 330 has three arc surfaces 331, 333 and 335, where two or more rollers of an external device engage and compress a flexible hose member against the midsection 330 of the hose piston member 314. The proximal portions 332 and 334 of the hose piston member 314, each have a transverse annular groove 350 surrounding the middles of the proximal portions 332 and 334 for accommodating O-ring seals to seal the hose piston member 314 inside the flexible hose member. The length "L" of the hose piston member 314 may be three times longer than the diameter "φ" of the hose piston member 314 as shown in FIG. 20.

Figure 22:
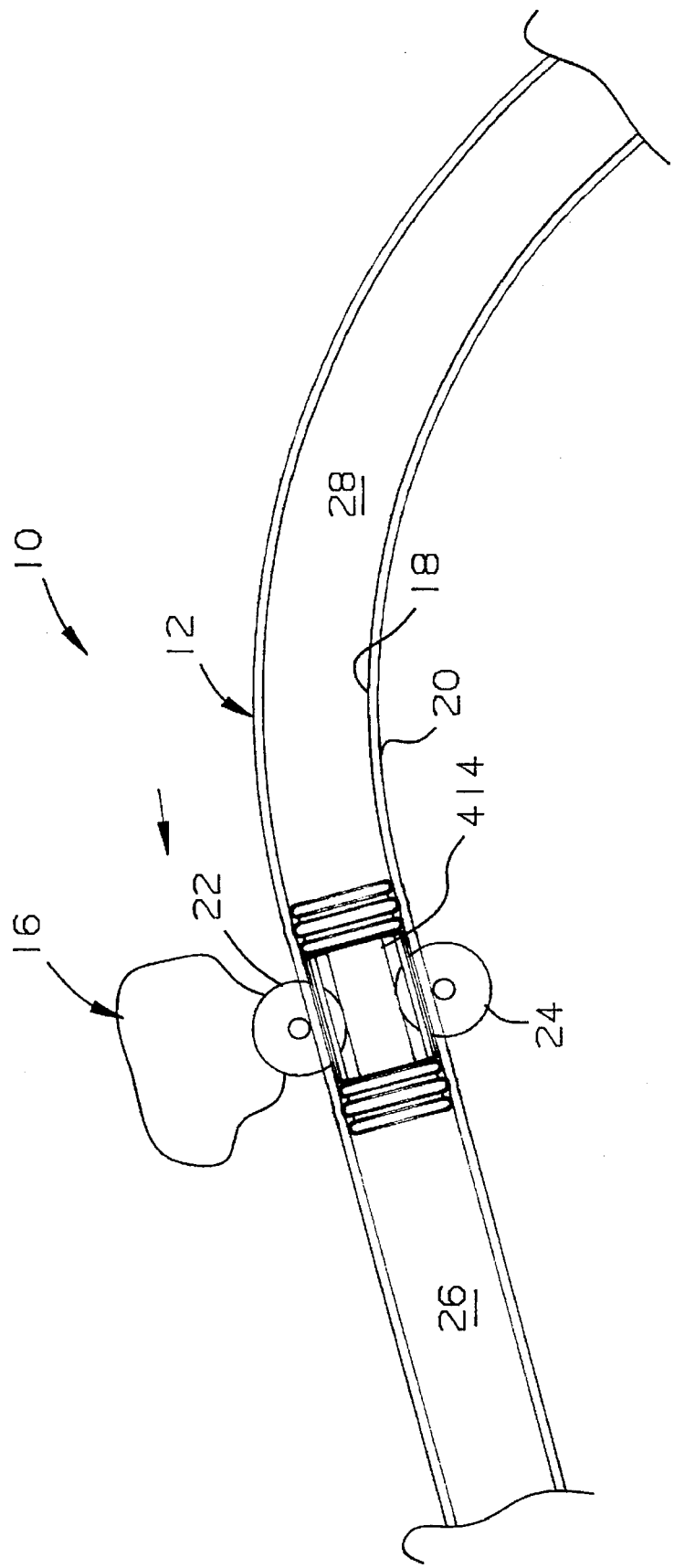
FIG. 22 is a side elevational view of a fifth embodiment of the present invention hose piston which is disposed inside a non-straight flexible hose member.

Referring to FIG. 22, there is shown at 10 the present invention apparatus which comprises a flexible hose member 12, an external coupling device 16 and a fifth embodiment of a hose piston member 414. The flexible hose member 12 and the external coupling device 16 are identical to the ones discussed above, and the description thereof will not be repeated. The only difference between this embodiment and the preferred embodiment is the nature and configuration of the hose piston member 414. All of the parts of this embodiment of the hose piston member 414 are numbered correspondingly with 400 added to each number.

Figure 23:
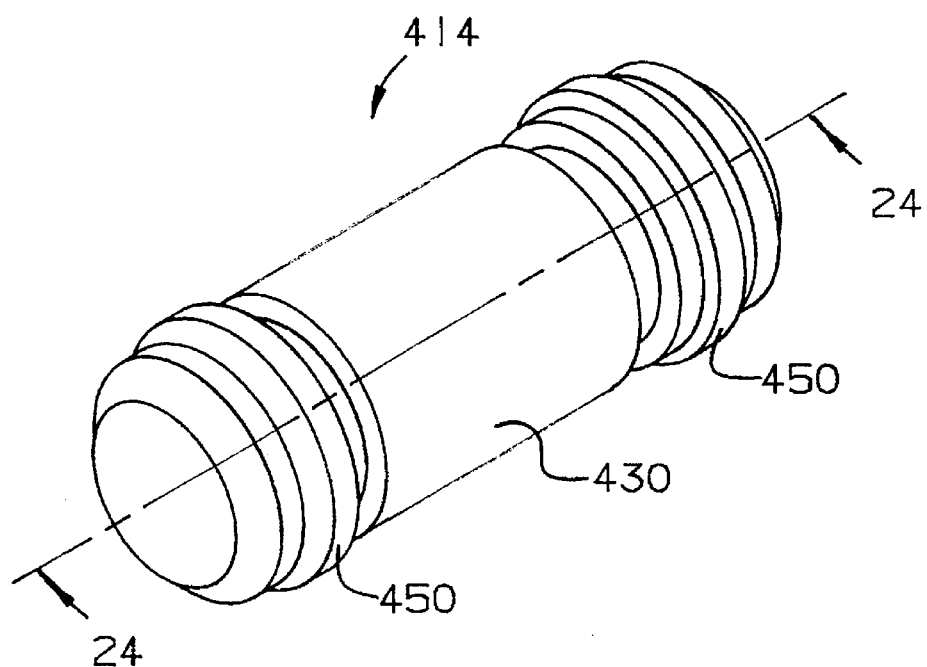
FIG. 23 is a perspective view of the hose piston shown in FIG. 22, showing a unitary configuration with no arc surfaces.
Figure 24:
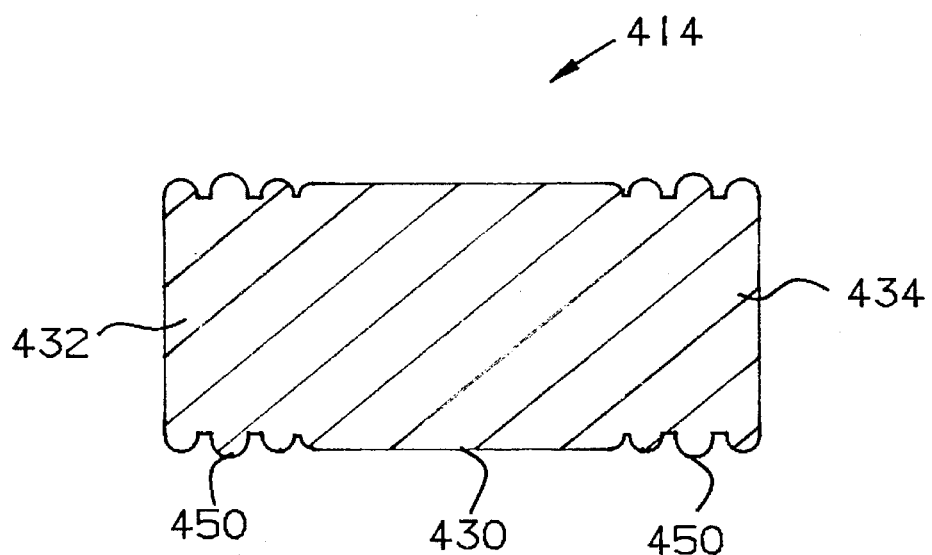
FIG. 24 is a cross-sectional view taken along line 24—24 of FIG. 23.

Referring to FIGS. 23 and 24, there is shown the fifth embodiment of the hose piston member 414 which is made from a unitary piece forming a generally longitudinal cylindrical symmetrical body. In this embodiment, the hose piston member 414 does not require O-ring seals. The hose piston member 414 comprises a smooth circular midsection 430, and two opposite proximal portions 432 and 434. The midsection 430 is engaged by two or more rollers 22 and 24 of the external device 16, where the rollers compress the flexible hose member 12 against the midsection 430 of the hose piston member 414 (see FIG. 22). Each of the proximal portions 132 and 134 has a transverse annular raised ridge 450, where the raised ridge assists in sealing the hose piston member 414 inside the hose member 12.

It will be appreciated that the present invention hose piston member is not limited to the above description. It is emphasized that while these configurations are preferred, it is also within the spirit and scope of the present invention to have multiplicity of configurations not described above.

It will also be appreciated that the present invention is not limited to pressure fluid inside the flexible hose member. It is emphasized that while the fluid is preferred, it is also within the spirit and scope of the present invention to utilize magnetic fields or other suitable means such as electromagnetic fields to move the hose piston member inside the flexible hose member.

Defined in detail, the present invention is an apparatus used in combination with a flexible hose member which has an exterior surface and an interior surface, the apparatus comprising: (a) a hose piston member formed by a multiplicity of individual pieces interconnected in series into a generally cylindrical shaped symmetrical member, the individual pieces including a midsection, two opposite proximal portions interlocked to the midsection, and two opposite distal portions interlocked respectively to the two opposite proximal portions; (b) the hose piston member disposed inside the flexible hose member and tightly engaged with the interior surface of the flexible hose member in a sealed fashion; and (c) the midsection of the hose piston member having a reduced diameter to accommodate a multiplicity of rollers of an external coupling device, such that the multiplicity of rollers are movably engage and compress the flexible hose member against the midsection of the hose piston member; (d) whereby when the hose piston member is disposed within the flexible hose member and the hose member is filled with fluid, the fluid pressure difference inside the flexible hose member will force the hose piston member to move along a given direction within the flexible hose member, which in turn causes the multiplicity of rollers of the external coupling device to travel along the flexible hose member in the same direction.

Defined broadly, the present invention is an apparatus used in combination with an external device which has at least two opposite rollers movably engaged with a flexible hose member and having an exterior surface and an interior surface, the apparatus comprising: (a) a hose piston member formed by a multiplicity of pieces interconnected together in series, the hose piston member including a midsection, two opposite proximal portions attached to the midsection, and two opposite distal portions attached respectively to the two opposite proximal portions; (b) the hose piston member disposed inside the flexible hose member and tightly engaged with the interior surface of the flexible hose member in a sealed fashion; and (c) the midsection of the hose piston member having a reduced diameter to accommodate the at least two opposite rollers of the external device, such that the at least two opposite rollers engage and compress the flexible hose member against the midsection of the hose piston member; (d) whereby when the hose piston member is disposed within the flexible hose member and filled with fluid, the fluid pressure difference inside the flexible hose member will force the hose piston member to move along a given direction within the flexible hose member, which in turn causes the at least two opposite rollers of the external device to travel along the flexible hose member in the same direction.

Defined more broadly, the present invention is an apparatus used in combination with an external device which has at least two rollers movably engaged with a flexible hose member and having an exterior surface and an interior surface, the apparatus comprising: (a) a piston member disposed inside the flexible hose member and tightly engaged with the interior surface of the flexible hose member in a sealed fashion and having a reduced diameter midsection to accommodate the at least two rollers of the external device, such that the at least two rollers engage and compress the flexible hose member against the reduced diameter midsection of the piston member; (b) whereby when the piston member moves along a given direction inside the flexible hose member under a pressure difference therein, it causes the at least two rollers of the external device to travel along on the flexible hose member in the same direction.

Defined even more broadly, the present invention is an apparatus used in combination with an external device which has at least one roller movably engaged with a hose member, the apparatus comprising: (a) a piston member disposed inside the hose member in a sealed fashion and having an engagement portion for accommodating the at least one roller of the external device, such that the at least one roller engages against the hose member at the location of the engagement portion of the piston member; (b) whereby when the piston member moves along a given direction inside the hose member under a pressure difference therein, it causes the at least one roller of the external device to travel along on the hose member in the same direction.

Defined even further more broadly, the present invention is an apparatus used in combination with an external device movably engaged with a hose member, the apparatus comprising: (a) a piston member disposed inside the hose member in a sealed fashion and having an engagement portion for accommodating the external device, such that the external device engages against the hose member at the location of the engagement portion of the piston member; (b) whereby when the piston member moves along a given direction inside the hose member under a pressure difference therein, it causes the external device to travel along on the hose member in the same direction.

Defined alternatively in detail, the present invention is an apparatus used in combination with an external device which has at least one roller movably engaged with a flexible cylinder member, the apparatus comprising: (a) a piston member disposed inside the flexible cylinder member in a sealed fashion and having an engagement portion for accommodating the at least one roller of the external device, such that the at least one roller engages the flexible cylinder member against the engagement portion of the piston member; (b) whereby when the piston member moves along a given direction inside the flexible cylinder member under a pressure difference therein, it causes the at least one roller of the external device to travel along on the flexible cylinder member in the same direction.

Defined alternatively broadly, the present invention is an apparatus used in combination with an external device movably engaged with a cylinder member, the apparatus comprising: (a) a piston member disposed inside the cylinder member in a sealed fashion and having an engagement portion for accommodating the external device, such that the external device engages the cylinder member against the engagement portion of the piston member; (b) whereby when the piston member moves along a given direction within the cylinder member under a pressure difference therein, it causes the external device to travel along the cylinder member in the same direction.

Of course the present invention is not intended to be restricted to any particular form or arrangement, or any specific embodiment disclosed herein, or any specific use, since the same may be modified in various particulars or relations without departing from the spirit or scope of the claimed invention hereinabove shown and described of which the apparatus shown is intended only for illustration and for disclosure of an operative embodiment and not to show all of the various forms or modifications in which the present invention might be embodied or operated.

The present invention has been described in considerable detail in order to comply with the patent laws by providing full public disclosure of at least one of its forms. However, such detailed description is not intended in any way to limit the broad features or principles of the present invention, or the scope of patent monopoly to be granted.

What is claimed is:

1. An apparatus in combination with a flexible hose member which has an exterior surface and an interior surface, the apparatus comprising:
   a. a hose piston member formed by a multiplicity of individual pieces interconnected in series into a generally cylindrical shaped symmetrical member, the individual pieces including a midsection, two opposite proximal portions interlocked to the midsection, and two opposite distal portions interlocked respectively to the two opposite proximal portions;
   b. said hose piston member disposed inside said flexible hose member and tightly engaged with said interior surface of said flexible hose member in a sealed fashion; and
   c. said midsection of said hose piston member having a reduced diameter to accommodate a multiplicity of rollers of an external coupling device, such that the multiplicity of rollers are movably engage and compress said flexible hose member against said midsection of said hose piston member;
   d. whereby when said hose piston member is disposed within said flexible hose member and said hose member is filled with fluid, the fluid pressure difference inside said flexible hose member will force said hose piston member to move along a given direction within said flexible hose member, which in turn causes said multiplicity of rollers of said external coupling device to travel along said flexible hose member in the same direction.

2. The apparatus in accordance with claim 1 further comprising two O-ring seals, each O-ring seal respectively disposed within an annular groove on said two opposite distal portions of said hose piston member for assisting in sealing said hose piston member against said interior surface of said flexible hose member.

3. The apparatus in accordance with claim 1 further comprising means to supply fluid under pressure wherein the fluid force inside said flexible hose member forces said hose piston member to move inside said flexible hose member, which causes said multiplicity of rollers of said external coupling device to move in a direction along the same line as the direction of movement as said hose piston member.

4. The apparatus in accordance with claim 1 wherein said hose piston member is made of aluminum material.

5. The apparatus in accordance with claim 1 wherein the length of said hose piston member is three times longer than the diameter of said hose piston member.

6. The apparatus in accordance with claim 1 wherein said midsection of said hose piston member is generally a cylindrical shaped rod.

7. The apparatus in accordance with claim 1 wherein said midsection of said hose piston member includes a multiplicity of arc surfaces which allow said multiplicity of rollers of said external coupling device to engage and compress said flexible hose member against said midsection of said hose piston member.

8. An apparatus in combination with an external device which has at least two opposite rollers movably engaged with a flexible hose member having an exterior surface and an interior surface, the apparatus comprising:
 a. a hose piston member formed by a multiplicity of pieces interconnected together in series, the hose piston member including a midsection, two opposite proximal portions attached to the midsection, and two opposite distal portions attached respectively to the two opposite proximal portions;
 b. said hose piston member disposed inside said flexible hose member and tightly engaged with said interior surface of said flexible hose member in a sealed fashion; and
 c. said midsection of said hose piston member having a reduced diameter to accommodate said at least two opposite rollers of said external device, such that said at least two opposite rollers engage and compress said flexible hose member against said midsection of said hose piston member;
 d. whereby when said hose piston member is disposed within said flexible hose member and said hose member is filled with fluid, the fluid pressure difference inside said flexible hose member will force said hose piston member to move along a given direction within said flexible hose member, which in turn causes said at least two opposite rollers of said external device to travel along said flexible hose member in the same direction.

9. The apparatus in accordance with claim 8 further comprising at least two O-ring seals, each O-ring seal respectively disposed within an annular groove on said two opposite distal portions of said hose piston member for assisting in sealing said hose piston member against said interior surface of said flexible hose member.

10. The apparatus in accordance with claim 8 further comprising means to supply fluid under pressure wherein the fluid force inside said flexible hose member forces said hose piston member to move inside said flexible hose member, which causes said at least two opposite rollers of said external device to move in a direction along the same line as the direction of movement as said hose piston member.

11. The apparatus in accordance with claim 8 wherein said hose piston member is made of metal material.

12. The apparatus in accordance with claim 8 wherein the length of said hose piston member is three times greater than the diameter of said hose piston member.

13. The apparatus in accordance with claim 8 wherein said midsection of said hose piston member is generally a cylindrical shaped rod.

14. The apparatus in accordance with claim 8 wherein said midsection of said hose piston member includes at least two opposite arc surfaces which allow said at least two opposite rollers of said external device to engage and compress said flexible hose member against said midsection of said hose piston member.

15. An apparatus in combination with an external device which has at least two rollers movably engaged with a flexible hose member having an exterior surface and an interior surface, the apparatus comprising:
 a. a piston member disposed inside said flexible hose member and tightly engaged with said interior surface of said flexible hose member in a sealed fashion and having a reduced diameter midsection to accommodate said at least two rollers of said external device, such that said at least two rollers engage and compress said flexible hose member against the reduced diameter midsection of the piston member;
 b. whereby when said piston member moves along a given direction inside said flexible hose member under a pressure difference therein, it causes said at least two rollers of said external device to travel along on said flexible hose member in the same direction.

16. The apparatus in accordance with claim 15 wherein said piston member is made of metal material.

17. The apparatus in accordance with claim 15 wherein the length of said piston member is three times greater than the diameter of said piston member.

18. The apparatus in accordance with claim 15 wherein said reduced diameter midsection of said piston member is generally a cylindrical shaped rod.

19. The apparatus in accordance with claim 15 wherein said reduced diameter midsection of said piston member includes at least two opposite arc surfaces.

20. The apparatus in accordance with claim 15 wherein said piston member is a unitary member.

21. The apparatus in accordance with claim 15 wherein said piston member is symmetrical.

22. The apparatus in accordance with claim 15 wherein said piston member is asymmetrical.

23. An apparatus in combination with an external device which has at least one roller movably engaged with a hose member, the apparatus comprising:
 a. a piston member disposed inside said hose member in a sealed fashion and having an engagement portion for accommodating said at least one roller of said external device, such that said at least one roller engages against said hose member at the location of the engagement portion of the piston member;
 b. whereby when said piston member moves along a given direction inside said hose member under a pressure difference therein, it causes said at least one roller of said external device to travel along on said hose member in the same direction.

24. An apparatus used in combination with an external device movably engaged with a hose member, the apparatus comprising:
 a. a piston member disposed inside said hose member in a sealed fashion and having an engagement portion for accommodating said external device, such that said external device engages against the hose member at the location of the engagement portion of the piston member;
 b. whereby when said piston member moves along a given direction inside said hose member under a pressure difference therein, it causes said external device to travel along on said hose member in the same direction.

25. An apparatus in combination with an external device which has at least one roller movably engaged with a flexible cylinder member, the apparatus comprising:
 a. a piston member disposed inside said flexible cylinder member in a sealed fashion and having an engagement portion for accommodating said at least one roller of said external device, such that said at least one roller engages said flexible cylinder member against the engagement portion of the piston member;
 b. whereby when said piston member moves along a given direction inside said flexible cylinder member under a pressure difference therein, it causes said at least one roller of said external device to travel along on said flexible cylinder member in the same direction.

26. The apparatus in accordance with claim 25 wherein the length of said piston member is three times greater than the diameter of said piston member.

27. The apparatus in accordance with claim 25 wherein said engagement portion of said piston member includes at least one arc surface which allows said at least one roller of said external device to engage and compress said flexible cylinder member against said engagement portion of said piston member.

28. The apparatus in accordance with claim 25 wherein said piston member is a unitary member.

29. The apparatus in accordance with claim 25 wherein said piston member is symmetrical.

30. The apparatus in accordance with claim 25 wherein said piston member is asymmetrical.

* * * * *